United States Patent
Loeffler et al.

(10) Patent No.: US 9,359,969 B2
(45) Date of Patent: Jun. 7, 2016

(54) METHOD FOR REGULATING HCCI COMBUSTION IN A REACTOR OF AN INTERNAL COMBUSTION ENGINE

(75) Inventors: Axel Loeffler, Backnang (DE); Wolfgang Fischer, Gerlingen (DE); Roland Karrelmeyer, Bietigheim-Bissingen (DE); Gerald Graf, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 825 days.

(21) Appl. No.: 13/520,765

(22) PCT Filed: Dec. 7, 2010

(86) PCT No.: PCT/EP2010/069032
§ 371 (c)(1),
(2), (4) Date: Nov. 8, 2012

(87) PCT Pub. No.: WO2011/082919
PCT Pub. Date: Jul. 14, 2011

(65) Prior Publication Data
US 2013/0054117 A1    Feb. 28, 2013

(30) Foreign Application Priority Data
Jan. 8, 2010   (DE) .................. 10 2010 000 747

(51) Int. Cl.
*F02M 7/00*   (2006.01)
*F02D 41/30*   (2006.01)
(Continued)

(52) U.S. Cl.
CPC ........ *F02D 41/3035* (2013.01); *F02D 41/1401* (2013.01); *F02D 13/0207* (2013.01);
(Continued)

(58) Field of Classification Search
CPC .......... F02D 41/3035; F02D 2041/001; F02D 35/028; F02D 13/0207; F02D 41/1401; F02D 2041/1427; F02D 2041/1415; F02D 2041/141; Y02T 10/128; Y02T 10/18; Y02T 10/44; F02B 1/12
USPC ........... 123/346–349, 90.15, 90.23, 435, 436, 123/299, 568.11, 568.14; 701/102–105
See application file for complete search history.

(56) References Cited

U.S. PATENT DOCUMENTS 7,322,341 B2 *  1/2008  Yamaguchi et al. .......... 123/435
2005/0211218 A1  9/2005  Liu et al.
(Continued)

FOREIGN PATENT DOCUMENTS

AT            6 753       3/2004
DE    10 2008 005524      7/2009
(Continued)

OTHER PUBLICATIONS

Gregory M. Shaver, Matthew J. Roelle, J. Christian Gerdes: "Decoupled Control of Combustion Timing and Work Output in Residual-Affected HCCI Engines", Proceedings of the 2005 American Control Conference, vol. 6, Jun. 10, 2005, pp. 3871-3876, XP002628757, Portland Oregon, Retrieved from the Internet : URL :http://ieeexplore.ieee.org/stamp/stamp.jsp ?tp=&arnumber= 1470578 [retrieved on Mar. 17, 2011] pp. 3873-3875; figures 3,4.
(Continued)

*Primary Examiner* — Joseph Dallo
(74) *Attorney, Agent, or Firm* — Norton Rose Fulbright US LLP (57) ABSTRACT

A method for regulating HCCI combustion of fuel in a reactor of an internal combustion engine is described in which a multivariable regulation is used, manipulated variable changes $\Delta u_k$ for the instantaneous regulating cycle k being determined on the basis of at least system deviations $\Delta x_{k-1}$ and manipulated variable changes $\Delta u_{k-1}$ of a preceding regulating cycle k−1.

16 Claims, 3 Drawing Sheets

(51) Int. Cl.
*F02D 41/14* (2006.01)
*F02D 13/02* (2006.01)
*F02D 41/00* (2006.01)

(52) U.S. Cl.
CPC ..... *F02D2041/001* (2013.01); *F02D 2041/141* (2013.01); *F02D 2041/1415* (2013.01); *F02D 2041/1427* (2013.01); *Y02T 10/128* (2013.01)

(56) References Cited

U.S. PATENT DOCUMENTS

| | | | |
|---|---|---|---|
| 2005/0235952 A1* | 10/2005 | Kuzuyama et al. | 123/305 |
| 2007/0021901 A1* | 1/2007 | Yamaguchi et al. | 701/105 |
| 2007/0265763 A1* | 11/2007 | Akazaki et al. | 701/103 |
| 2007/0270983 A1* | 11/2007 | Yasui | 700/31 |
| 2008/0035125 A1* | 2/2008 | Jankovic | 123/556 |
| 2008/0066713 A1* | 3/2008 | Megli et al. | 123/295 |
| 2008/0264360 A1* | 10/2008 | Dagci et al. | 123/52.1 |
| 2008/0264382 A1* | 10/2008 | Kang | 123/435 |
| 2008/0308067 A1* | 12/2008 | Schuckert et al. | 123/435 |
| 2009/0095250 A1* | 4/2009 | Kuzuyama | 123/27 R |
| 2009/0101110 A1* | 4/2009 | Hathout et al. | 123/406.43 |
| 2009/0132145 A1* | 5/2009 | Angeby | 701/102 |
| 2009/0164104 A1* | 6/2009 | Wermuth et al. | 701/105 |
| 2009/0182491 A1* | 7/2009 | Bauer et al. | 701/115 |
| 2009/0187325 A1 | 7/2009 | Loeffler et al. | |
| 2009/0211825 A1* | 8/2009 | Mann et al. | 180/65.275 |
| 2009/0229564 A1* | 9/2009 | Kang et al. | 123/295 |
| 2009/0229565 A1* | 9/2009 | Kang et al. | 123/295 |
| 2009/0234556 A1* | 9/2009 | Kang et al. | 701/102 |
| 2009/0259385 A1* | 10/2009 | Loeffler et al. | 701/102 |
| 2009/0272363 A1* | 11/2009 | Yun et al. | 123/295 |
| 2009/0281708 A1* | 11/2009 | Loeffler et al. | 701/103 |
| 2009/0281713 A1* | 11/2009 | Jankovic et al. | 701/111 |
| 2009/0301435 A1* | 12/2009 | Weissenborn et al. | 123/435 |

FOREIGN PATENT DOCUMENTS

| | | |
|---|---|---|
| JP | 7-119509 | 5/1995 |
| JP | 2007-530858 | 11/2007 |
| JP | 2008-175198 | 7/2008 |
| JP | 2011-132838 | 7/2011 |

OTHER PUBLICATIONS

Nikhil Ravi, Matthew J. Roelle, Adam F. Jungkunz, J. Christian Gerdes: "Model Based Control of Exhaust Recompression HCCI", Proceedings of the Fifth IFAC Symposium on Advances in Automotive Control, Aug. 22, 2007, XP002628758, Aptos, California, Retrieved from the Internet : URL :http://ddl.stanford.edu/files/AAC07_0084_FI.pdf [retrieved on Mar. 17, 2011] para. [0003]-[0004].

* cited by examiner

METHOD FOR REGULATING HCCI COMBUSTION IN A REACTOR OF AN INTERNAL COMBUSTION ENGINE

FIELD OF THE INVENTION

The present invention relates to a method for regulating HCCI combustion of fuel in a reactor of an internal combustion engine.

BACKGROUND INFORMATION

Various combustion processes are understood to take place in internal combustion engines. The control and regulation of the so-called HCCI combustion process for gasoline engines (homogeneous charge compression ignition is also known as gasoline HCCI or controlled auto ignition—CAI). HCCI refers to a lean combustion process aimed at a significant reduction in consumption, amounting to 10-15% of fuel in the automobile (by dethrottling the engine operation and by thermodynamically favorable combustion) without significant untreated nitrogen oxide emissions (the 3-way catalytic converter does not reduce nitrogen in lean operation) and thus also without having to accept additional costs for exhaust gas aftertreatment.

Since the gasoline fuel and the compression ratio of a gasoline engine are designed in such a way that self-ignitions (knocking) are prevented as much as possible, the thermal energy required for the HCCI process must be supplied in another way. This may be accomplished in various ways, e.g., by retention or recirculation of the hot internal residual gas or heating of the fresh air. In the present case, a method using exhaust gas retention and recirculation is taken as a basis.

Carrying out an HCCI combustion process requires a number of functionalities of the internal combustion engine, in particular direct injection, a (partially) variable valve gear (e.g., phase adjustability and 2-point lift) as well as an acknowledgement from the combustion (e.g., combustion chamber pressure, structure-borne noise, ionic current, high-resolution rotational speed signal, etc.).

In this context, the engine control must be expanded by adding specific functions for both steady-state control and regulation of HCCI combustion as well as for dynamic control and regulation (load changes and switching of operating modes). The object of steady-state control and regulation is to maintain/set the operating point, cylinder balance and compensation of environmental influences. The object of dynamic control and regulation is to permit the quickest possible load changes and thereby not allow either knocking or misfirings.

The HCCI combustion process requires careful coordination between control and regulation of the combustion itself as well as air system states in the intake manifold to achieve the consumption advantages described here with acceptable pollutant emissions at the same time.

In the wake of the so-called basic application, corresponding values are determined for the control variables (e.g., throttle valve, EGR valve, injection timing and quantity, valve settings (e.g., opening and closing angles) for the intake and exhaust valves, etc.).

In this context, however, it is problematic that there is a high sensitivity of the combustion with regard to environmental conditions, fuel quality and fuel composition, operating history (high/low load), etc., even in steady-state HCCI engine operation. In addition, different interfering effects and marginal effects occur individually for each cylinder (uneven EGR distribution, different internal/external cylinder wall temperatures). It is difficult to acquire data for the control engine characteristics maps because the optimal values are subject to fluctuations both in the short term (e.g., fuel quality) and in the long term (e.g., component aging).

Suboptimal operating phases occur briefly during dynamic HCCI operation (e.g., load change) because the control actions are subject to a deceleration to varying degrees due to the hardware. This is due to the fact that air system states follow the intake manifold dynamics and the phase adjusters are subject to down times as well as being rate-limited, while the injection system may be corrected from one cycle to the next and thus offers the best opportunity for rapid control action.

It would be desirable to deal with these problems.

SUMMARY OF THE INVENTION

According to the exemplary embodiments and/or exemplary methods of the present invention, a method having the features is described herein. Advantageous embodiments are the subject matter of the subclaims as well as the following description.

An aspect of the exemplary embodiments and/or exemplary methods of the present invention relate to a basic control and regulation concept for HCCI operation, in which cycle-to-cycle links are taken into account. In particular, these are described: variants of an operating point controller, which adjusts the multivariable system combustion on the basis of an empirically ascertained model independently of environmental conditions, fuel quality, operating history, etc., a cylinder balancer which compensates for the cylinder imbalances in principle with regard to the combustion features, an adaptation concept which adapts the control engine characteristics maps as a function of long-term fluctuation effects as well as a dynamic compensation, which takes into account the different controller dynamics.

Advantages of the Invention

The exemplary embodiments and/or exemplary methods of the present invention provide the option of at least reducing the aforementioned problems, which occur in the related art. Through implementation of a multivariable regulation coupled to the cycle, the influenceability of the combustion is reduced during steady-state HCCI engine operation. The interfering influences and boundary effects, which are different for each individual cylinder, are taken into account. Data acquisition for the control characteristics maps is simplified. During dynamic HCCI operation, the occurrence of suboptimal operating phases may be reduced.

The multivariable regulation on which the exemplary embodiments and/or exemplary methods of the present invention is based is initially described below.

The following relationship is advantageously assumed for the state change during the HCCI combustion process, disregarding the system noise:

$$\Delta x_k = A \cdot \Delta x_{k-1} + B_1 \cdot \Delta u_k + B_2 \cdot \Delta u_{k-1} \qquad [1]$$

where x denotes the vector of the controlled variables (e.g., combustion features and/or air system states), u denotes the vector of the manipulated variables, A denotes the system matrix, $B_1$ and $B_2$ denote the input matrices, k denotes the time increment or cycle and $\Delta$ denotes a difference from a setpoint value (for states x) or from a precontrol value (for manipulated variables u). If there is no precontrol, then $\Delta u$ describes the manipulated variables per se.

First term $A \cdot \Delta x_{k-1}$ describes the cycle-to-cycle link, which occurs during the HCCI combustion process in contrast with traditional gasoline or diesel engine combustion. It has also been recognized that the state change $\Delta x_k$ of instantaneous cycle k depends on the input variable change of the instantaneous cycle as well as in the preceding cycle, which is described by matrices $B_1$ and $B_2$ in an advantageous embodiment.

In steady-state operation at a stable operating point with minor control actions for cylinder balance, the transient phenomena may advantageously be disregarded, i.e., it is assumed that the system deviation for the k-th cycle may be approximated well on the average by the (measured) system deviation of the (k−1)-th cycle. It may be derived from this:

$$A \cong \begin{bmatrix} 1 & 0 & \ldots & 0 \\ 0 & 1 & \ldots & \ldots \\ \ldots & \ldots & 1 & 0 \\ 0 & \ldots & 0 & 1 \end{bmatrix} \Rightarrow \Delta x_k = \Delta x_{k-1} + B_1 \cdot \Delta u_k + B_2 \cdot \Delta u_{k-1} \quad [2]$$

The manipulated variable change $\Delta u_k$ which is necessary for the k-th cycle may thus be calculated directly from system deviation $\Delta x_{k-1}$ and intervention $\Delta u_{k-1}$ of the (k−1)-th cycle if $\Delta x_k = 0$ is required (the system deviation in cycle k should disappear). This yields:

$$-(x_{REF} - x_{k-1}) = B_1 \cdot \Delta u_k + B_2 \cdot \Delta u_{k-1} \quad [3]$$

where $x_{REF}$ describes setpoint values and describes actual values.

With invertibility of $B_1$ this yields the required manipulated variable change $\Delta u_k$ directly as:

$$\Delta u_k = -B_1^{-1} \cdot (x_{REF} - x_{k-1}) - B_1^{-1} \cdot B_2 \cdot \Delta u_{k-1} \quad [4]$$

where $(x_{REF} - x_{k-1}) = \Delta x_{k-1}$

Using the example of a multivariable regulation (x: IMEP: mean indexed pressure, λ: air ratio, MFB50: location of the center of combustion, dpmax: maximum pressure gradient; u: q: injection quantity, EVC: closing angle of the exhaust valve, EGR: EGR rate in the intake manifold, SOI: injection angle), the method will be explained as an example with specific examples. Equation [3] yields the following in this case:

$$-\begin{bmatrix} IMEP_{REF} - IMEP_{k-1} \\ \lambda_{REF} - \lambda_{k-1} \\ MFB50_{REF} - MFB50_{k-1} \\ dpmax_{REF} - dpmax_{k-1} \end{bmatrix} =$$

$$\begin{bmatrix} \frac{\partial IMEP}{\partial q_k} & 0 & 0 & 0 \\ \frac{\partial \lambda}{\partial q_k} & \frac{\partial \lambda}{\partial EVC_k} & \frac{\partial \lambda}{\partial EGR_k} & 0 \\ 0 & \frac{\partial MFB50}{\partial EVC_k} & \frac{\partial MFB50}{\partial EGR_k} & \frac{\partial MFB50}{\partial SOI_k} \\ \frac{\partial dpmax}{\partial q_k} & \frac{\partial dpmax}{\partial EVC_k} & \frac{\partial dpmax}{\partial EGR_k} & \frac{\partial dpmax}{\partial SOI_k} \end{bmatrix} \cdot \begin{bmatrix} \Delta q_k \\ \Delta EVC_k \\ \Delta EGR_k \\ \Delta SOI_k \end{bmatrix} +$$

$$\begin{bmatrix} 0 \\ 0 \\ \frac{\partial MFB50}{\partial q_{k-1}} \\ \frac{\partial dpmax}{\partial q_{k-1}} \end{bmatrix} \cdot \Delta q_{k-1}$$

where 0 as a matrix element indicates only a negligible dependence of the corresponding feature on the corresponding manipulated variable—or none at all.

The computational complexity required to achieve this goal may advantageously be reduced if cylinder-individual interventions for cylinder balancing are decoupled from global interventions for regulating the operating point. In an exemplary embodiment, a two-step equation system based on [3] is proposed.

The global interventions for regulating the operating point are described by the equation system:

$$-\begin{bmatrix} IMEP_{REF} - \overline{IMEP_{k-1}} \\ MFB50_{REF} - \overline{MFB50_{k-1}} \\ \lambda_{REF} - \lambda_{k-1} \end{bmatrix} =$$

$$\begin{bmatrix} \frac{\partial \overline{IMEP}}{\partial \overline{q_k}} & 0 & 0 \\ 0 & \frac{\partial \overline{MFB50}}{\partial EVC_k} & \frac{\partial \overline{MFB50}}{\partial EGR_k} \\ \frac{\partial \lambda}{\partial \overline{q_k}} & \frac{\partial \lambda}{\partial EVC_k} & \frac{\partial \lambda}{\partial EGR_k} \end{bmatrix} \cdot \begin{bmatrix} \Delta \overline{q_k} \\ \Delta EVC_k \\ \Delta EGR_k \end{bmatrix} + \begin{bmatrix} 0 \\ \frac{\partial \overline{MFB50}}{\partial q_{k-1}} \\ 0 \end{bmatrix} \cdot \Delta \overline{q_{k-1}}$$

where $$\overline{IMEP_k} = \frac{\sum_{i=1}^{n\_Zylinder} IMEP_{i,k}}{n\_Zylinder};$$

$$\overline{MFB50_k} = \frac{\sum_{i=1}^{n\_Zylinder} MFB50_{i,k}}{n\_Zylinder};$$

$$\Delta \overline{q} = \frac{\sum_{i=1}^{n\_Zylinder} \Delta q}{n\_Zylinder}$$

Zylinder=cylinder each for k and k−1.

The "crossed" variables are mean values over the cylinders. Alternatively, the latest cylinder ($MFB50_k^{max}$) or the earliest cylinder ($MFB50_k^{max}$) may also be utilized for the combustion position.

The cylinder-individual interventions for cylinder balancing are described by:

$$\begin{bmatrix} IMEP_{i,k-1} - \overline{IMEP_{k-1}} \\ MFB50_{i,k-1} - \overline{MFB50_{k-1}} \end{bmatrix} =$$

-continued $$\begin{bmatrix} \frac{\partial IMEP_k}{\partial q_k} & 0 \\ 0 & \frac{\partial MFB50_k}{\partial SOI_k} \end{bmatrix} \cdot \begin{bmatrix} \Delta q_{i,k} \\ \Delta SOI_{i,k} \end{bmatrix} + \begin{bmatrix} 0 \\ \frac{\partial MFB50_k}{\partial q_{k-1}} \end{bmatrix} \cdot \Delta q_{i,k-1} \quad [5]$$

where the mean value or the maximum or minimum value describes the new reference.

In the present embodiment, a 4×4 dependence may thus be replaced by a 3×3 dependence and a 2×2 dependence. The computational complexity (the equation system must be calculated for each cylinder) and the high application complexity because of four independent controlled variables may therefore be reduced.

The method presented so far deals essentially with so-called steady-state HCCI operation. This advantageously takes into account manipulated variable dynamics, in which dynamic compensation is introduced to improve the applicability for dynamic HCCI operation (e.g., in load change phases).

Dynamic compensation will now be explained using the following somewhat simplified presentation with respect to equation [1]:

$$\Delta x_k = a \cdot \Delta u_{1k} + b \cdot \Delta u_{2k} \quad [5]$$

where x describes a single controlled variable (a single combustion feature, e.g., MFB50), $u_1$, $u_2$ are the values of two manipulated variables (e.g., EVC and SOI) and a, b are the corresponding sensitivities. If $u_1$ (e.g., EVC) mentioned above is subject to known dynamics, i.e., there is a difference between the commanded value and the instantaneous value of manipulated variable $u_1$, this difference may be compensated by an intervention into manipulated variable $u_2$ (e.g., SOI), which is assumed (to be instantaneously effective). There is therefore a model based on measured data, which is advantageously used to describe the dynamics.

The following correction value is thus obtained from equation [5] using the requirement $\Delta x_k = 0$ mentioned above:

$$\Delta u_{2k} = -\frac{a}{b} \cdot \Delta u_{1k} \quad [6]$$

In an exemplary embodiment, an adaptation of precontrol engine characteristics maps is carried out on the basis of the regulating system. It is thus possible to change the precontrol values, which depend on the operating point, by integral components of the manipulated variable correction of the controller which result long-term at the respective operating point. This change is advantageously stored. As a result, long-term changes, e.g., due to injector aging effects, are already taken into account in the precontrol, and the controllers need only compensate for brief environmental and fuel influences, etc. This has proven to be advantageous during dynamic operation in particular, in which the controller has only a few combustion cycles of time to engage. This is also the case in emergency situations, e.g., in failure of a sensor, in which no regulation is possible any longer under some circumstances.

A computing unit according to the exemplary embodiments and/or exemplary methods of the present invention, e.g., a control unit of a motor vehicle, is equipped from the standpoint of the program technology in particular to carry out a method according to the present invention.

The implementation of this method in the form of software is advantageous since this incurs particularly low costs, in particular when an executing control unit is still being used for other tasks and is therefore present anyway. Suitable data media for supplying the computer program include in particular diskettes, hard drives, flash memories, EEPROMs, CD-ROMs, DVDs, etc. It is also possible to download a program via computer networks (Internet, Intranet, etc.).

According to another aspect of the exemplary embodiments and/or exemplary methods of the present invention, instead of the multivariable regulation, an SISO regulation may also be used for an HCCI method.

To reduce the application complexity, i.e., in particular the measurement complexity with respect to the sensitivities, a decoupled structure may also be selected. In other words, precisely one manipulated variable is used to regulate precisely one combustion feature/air system state and disregards the cross-influences of this manipulated variable on the other features/air system states.

It has been found that this is sufficient in practice if the controller dynamics is limited accordingly through appropriate choice of the respective gain factors. It is therefore possible to provide that the entire use range of the HCCI combustion process is subdivided into a number of submodes and separate engine characteristics maps and/or characteristics map areas are assigned to each of these modes.

It lends itself to define three HCCI ranges, these ranges being identified below as HCCI1, HCCI2 and HCCI3.

A lower load range is referred to as HCCI1. The residual gas is additionally heated to generate thermal energy for self-ignition by a partial combustion here in the interim compression phase.

A middle load range, which is characterized by lean operation without external residual gas, is referred to as HCCI2.

An upper load range is referred to as HCCI3. In this case, hot internal residual gas is replaced by cooler external residual gas, thereby lowering the combustion chamber temperature. In addition, λ=1 is set to enable the 3-way catalytic converter to reduce nitrogen oxides. Ignition support may be provided.

These three ranges may advantageously be regulated as described below.

| HCCI1 | |
|---|---|
| Combustion feature/air system state | Manipulated variable |
| p22 or p21-p22 [Intake manifold pressure or difference between the pressure upstream from the throttle valve and the pressure downstream from the throttle valve] | Throttle valve setting |
| MFB50max [latest cylinder] | EVC |
| MFB50i [cylinder-individual position] | SOIPIi [cylinder-individual injection angle] or qPli [cylinder-individual quantity of preinjection] |
| IMEPi [cylinder-individual mean pressure] | qi [cylinder-individual total or main injection quantity] |

| HCCI2 | |
| --- | --- |
| Combustion feature/air system state | Manipulated variable |
| p22 or p21-p22 [Intake manifold pressure or difference between the pressure upstream from the throttle valve and the pressure downstream from the throttle valve] or λ [air ratio at the threshold to HCCI3] | Throttle valve setting |
| MFB50max [latest cylinder] | EVC |
| MFB50i [cylinder-individual position] | SOIi [cylinder-individual injection angle] |
| IMEPi [cylinder-individual mean pressure] | qi [cylinder-individual injection quantity] |

| HCCI3 | |
| --- | --- |
| Combustion feature/air system state | Manipulated variable |
| p22 or p21-p22 [Intake manifold pressure or difference between the pressure upstream from the throttle valve and the pressure downstream from the throttle valve] | Throttle valve setting |
| λ [air ratio] | qmean [mean injection quantity] |
| MFB50max [latest cylinder] | EGR valve setting |
| MFB50i [cylinder-individual position] | SPIGi [cylinder-individual ignition angle] |
| IMEPmean [mean value of the mean indexed pressure] | EVC |

Additional advantages and embodiments of the present invention are derived from the description in the accompanying drawings.

It is self-evident that the features mentioned above and those yet to be explained below may be used not only in the particular combination given but also in other combinations or alone without going beyond the scope of the present invention.

The exemplary embodiments and/or exemplary methods of the present invention are depicted in the drawings on the basis of an exemplary embodiment and is described in greater detail below with reference to the drawings.

DETAILED DESCRIPTION

Figure 1:
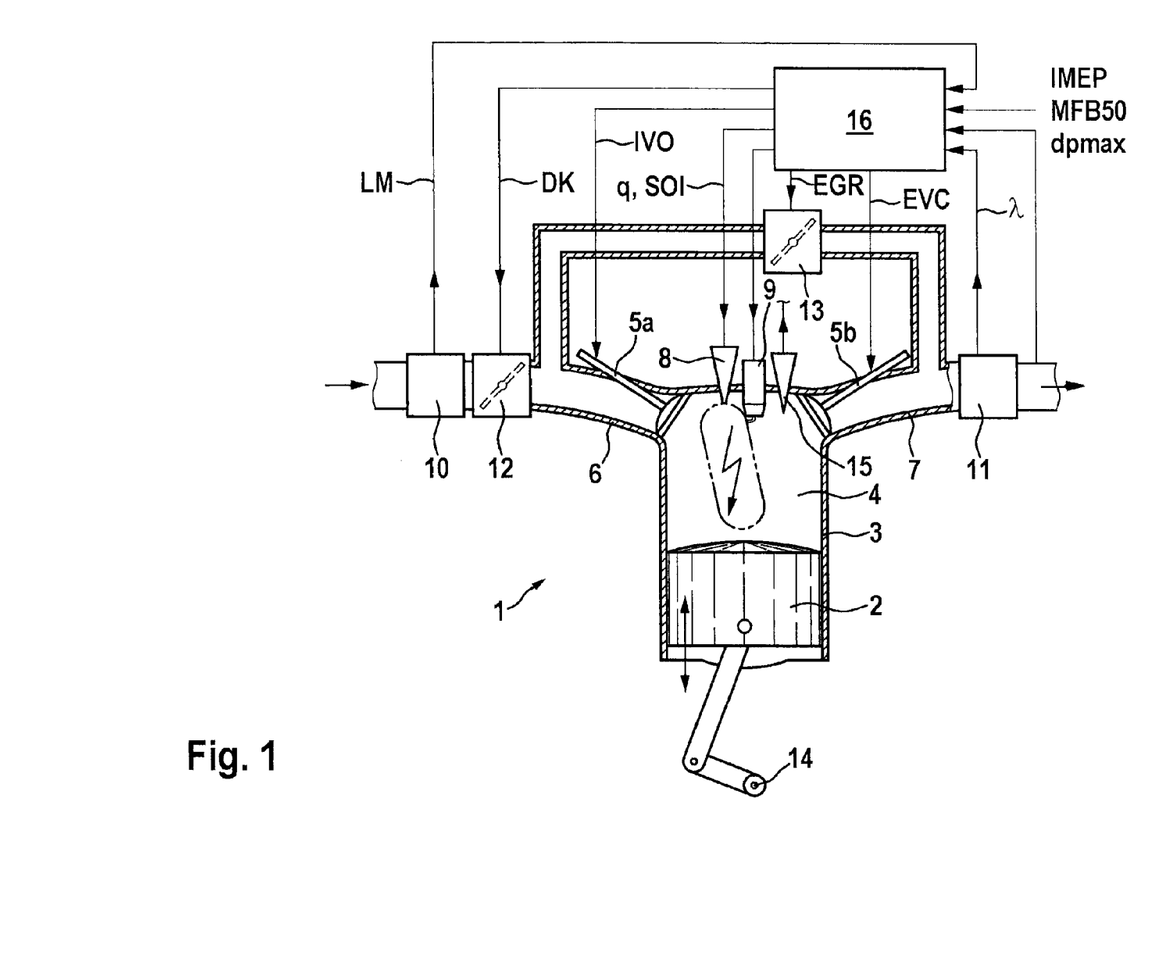
FIG. 1 shows a schematic diagram of an internal combustion engine having a control unit.

FIG. 1 shows an internal combustion engine 1, in which a piston 2 is movable up and down in a cylinder 3. Cylinder 3 is provided with a reactor, i.e., a combustion chamber 4, to which an intake manifold 6 and an exhaust pipe 7 are connected via valves 5a and 5b. Valves 5a, 5b are equipped with an adjustable valve gear, intake valve 5a here being triggerable by a signal IVO and exhaust valve 5b being triggerable by a signal EVC. Intake manifold 6 is provided with an air mass sensor 10, and exhaust pipe 7 is provided with a lambda sensor 11. Exhaust gas recirculation having an exhaust gas recirculation valve 13 triggerable via a signal EGR is situated between the intake manifold and the exhaust pipe.

For exhaust gas recirculation, intake valve 5a may be triggered in such a way that a portion of the exhaust gas flows back into intake manifold 6 due to early opening of intake valve 5a.

For exhaust gas retention, which is a particular approach, exhaust valve 5b may be triggered in such a way that a portion of the exhaust gas is retained due to early closing of exhaust valve 5b. Intake valve 5a is opened late to prevent the retained exhaust gas from flowing back into intake manifold 6.

In addition, combustion chamber 4 is connected to a fuel injector 8 triggerable by signals q and SOI and to a triggerable spark plug 9. In the HCCI method, the spark plug is not used for ignition of the fuel/air mixture in the combustion chamber. Self-ignition occurs instead. The spark plug is provided for the other modes of operation. The combustion chamber also has a combustion chamber pressure sensor 15 for measuring the combustion chamber pressure.

Air mass sensor 10 measures the air mass of fresh air supplied to intake manifold 6 and generates a signal LM as a function of same. Lambda sensor 11 measures the oxygen content of the exhaust gas in exhaust pipe 7 and generates a signal lambda λ as a function of same. In addition, a mean indexed pressure IMEP, a location of the center of combustion MFB50 and a maximum pressure gradient dpmax may be calculated from the measured combustion chamber pressure. Alternatively, IMEP and MFB50 are features which may be determined from a high-resolution rotational speed signal or from the measuring signal of an ionic current sensor.

A throttle valve 12, whose rotational position is adjustable with the aid of a signal DK, is accommodated in intake manifold 6. An exhaust system (not shown) including a catalytic converter, for example, a 3-way catalytic converter, is downstream from lambda probe 11.

In an HCCI mode with exhaust gas retention in external combustion engine 1, throttle valve 12 is opened as a function of the desired supplied air mass, in order to generate a lean mixture. Fuel is injected into combustion chamber 4 by fuel injector 8 during the interim compression phase close to the load change TDC (top dead center) induced by early closing and late opening of the exhaust and intake valves. Due to the high temperatures prevailing in the combustion chamber, there is rapid evaporation of fuel and therefore a very good formation of the mixture in combustion chamber 4. In the following intake phase, fresh air is drawn into combustion chamber 4. The fuel/air mixture is then compressed during the compression phase until it self-ignites due to the rising temperature. Piston 2 is driven by the expansion of the ignited fuel. A crankshaft 14 is set in motion rotationally by the driven piston, ultimately driving the wheels of the vehicle.

It is self-evident that an internal combustion engine may have more than one cylinder, which are assigned to the same crankshaft and to the same exhaust pipe and form an exhaust gas bank.

A control unit 16 is provided for regulating the HCCI method, among other things. For this purpose, control unit 16 is provided with a microprocessor, a program suitable for carrying out the entire control and/or regulation of internal combustion engine 1 being stored in a memory medium, in particular in a read-only memory (ROM). Control unit (ECU) 16 is equipped to carry out a method according to the present invention.

Control unit 16 receives input signals which represent operating variables of the internal combustion engine measured with the aid of sensors. For example, control unit 16 is connected to air mass sensor 10, lambda sensor 11, etc. In addition, control unit 16 is connected to a gas pedal sensor (not shown), among other things. Control unit 16 generates output signals with which the behavior of internal combustion engine 1 may be influenced via actuators according to the desired control and/or regulation. For example, control unit 16 is connected to fuel injector 8, to valves 5a, 5b, to spark plug 9 and to throttle valve 12 and generates the signals required to trigger them.

Figure 2A:
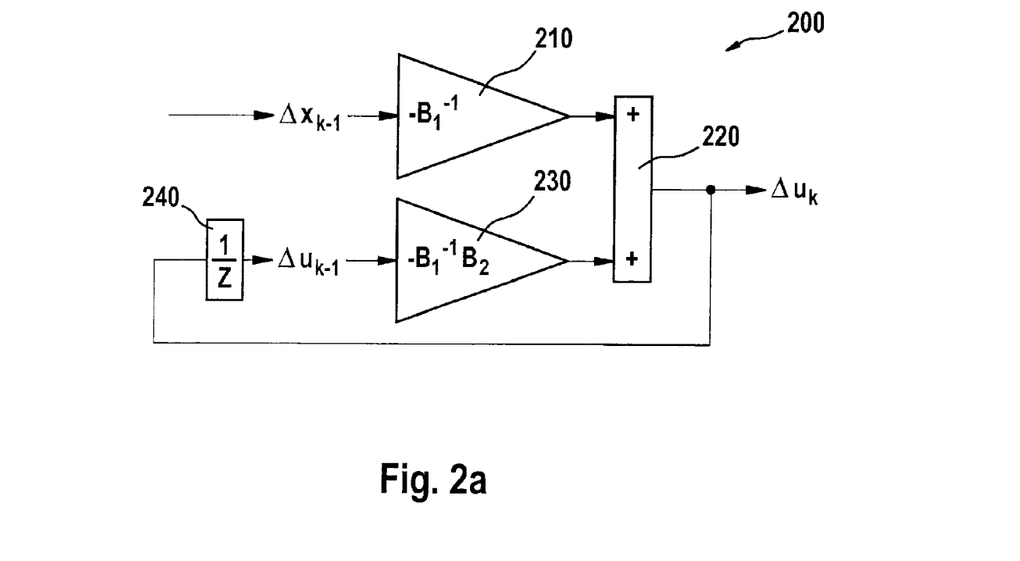
FIG. 2a shows a multivariable compensation function according to a first embodiment of the present invention.

FIG. 2a shows a multivariable compensation function according to a first embodiment of the present invention, labeled as 200. Multivariable compensation function 200 is used to determine manipulated variable changes $\Delta u_k$ of the k-th cycle. For this purpose, system deviations $\Delta x_{k-1}$ of the k−1-th cycle are sent to a multiplier 210, which carries out a multiplication times the negative of inverted first input matrix $-B_1^{-1}$. The result is sent to an adder 220. Furthermore, manipulated variable changes $\Delta u_{k-1}$ of the k−1-th cycle are also sent to adder 220 via a multiplier 230. Multiplier 230 also includes second input matrix $B_2$ in addition to the negative inverted first input matrix. The feedback of manipulated variable changes $\Delta u$ from one cycle to the next is accomplished via an element 240, which represents a delayer, to supply manipulated variable changes $\Delta u_{k-1}$.

Figure 2B:
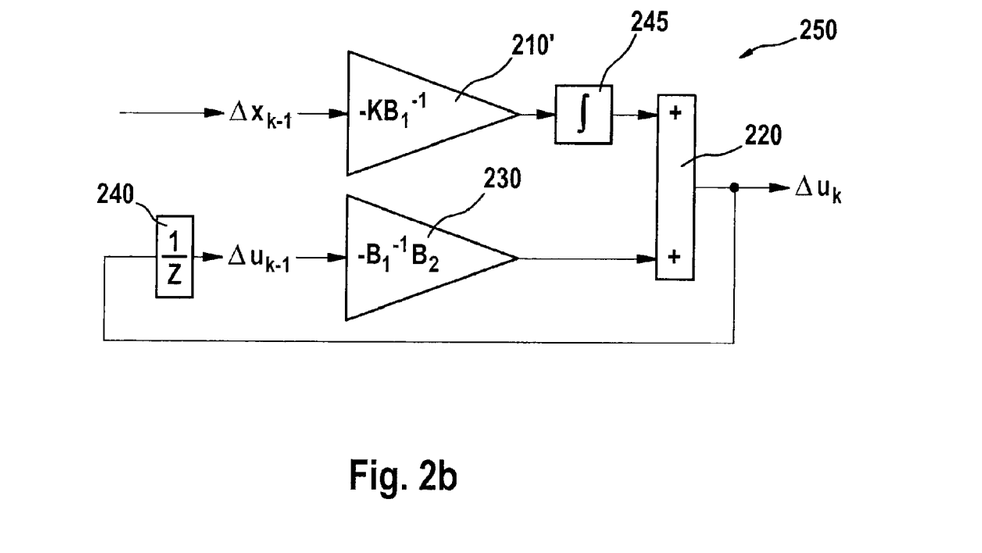
FIG. 2b shows a multivariable compensation function according to a second embodiment of the present invention.

A second specific embodiment of a multivariable compensation function 250 is explained with reference to FIG. 2b. Diagram 250 corresponds essentially to diagram 200, differing from the latter only through changes in the upper branch, i.e., a change of element 210, which is referred to as 210' in a modified form, and an insertion of an element 245.

Since system deviations $\Delta x_{k-1}$ usually have a significant noise component, the noise is smoothed via an integrator 245 in variant 250, which is more relevant for actual practice. In addition, a gain factor K (0<K<1), which is to be determined in the application, is provided in element 210'. The sensitivities, i.e., the change of the combustion features with a change of the manipulated variables, are to be determined experimentally as a function of the operating point.

Figure 3:
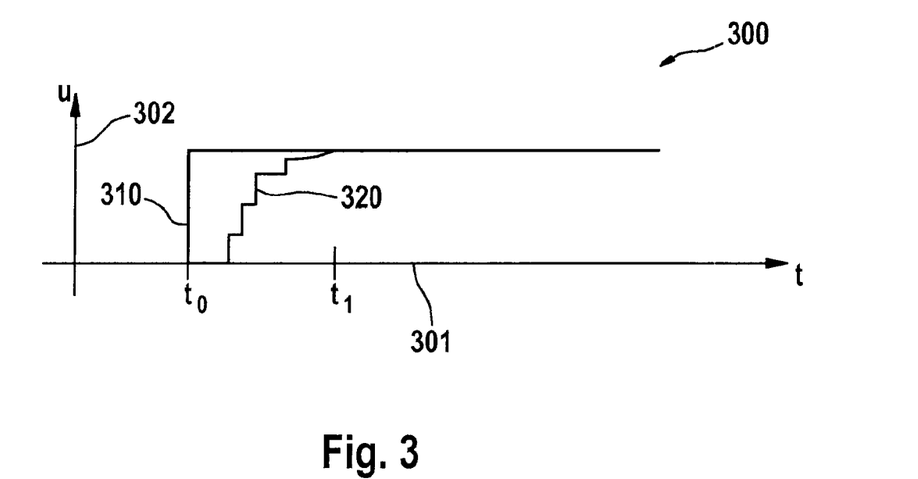
FIG. 3 shows the dynamic performance of a manipulated variable.

FIG. 3 shows manipulated variable dynamics schematically in a diagram 300, which may be taken into account in an exemplary embodiment of the present invention by compensating the dynamics of a first manipulated variable through intervention into a second manipulated variable. Diagram 300 shows a manipulated variable u on an ordinate 302 plotted against time t on an abscissa 301. In this diagram, a setpoint manipulated variable is labeled as 310 and the resulting actual manipulated value is labeled as 320. As is apparent, the signal commanded at a point in time $t_0$ is implemented only at a later point in time $t_1$. This difference between the commanded value and the instantaneous value is compensated by an intervention into a second manipulated variable.

What is claimed is:

1. A method for regulating HCCI combustion of fuel in a reactor of an internal combustion engine, the method comprising:
   determining, by a controller including a processor, as part of a multivariable regulation, manipulated variable changes $\Delta u_k$ for controlling the instantaneous regulating cycle k based on at least system deviations $\Delta x_{k-1}$ and manipulated variable changes $\Delta u_{k-1}$ of a preceding regulating cycle k−1, wherein system deviation $\Delta x$ of at least one of a mean indexed pressure IMEP, an air ratio λ, and a maximum pressure gradient dpmax is detected, and wherein decoupling of cylinder-individual interventions for cylinder balancing from global interventions is carried out for regulating an operating point; and
   controlling, by the controller, the HCCI combustion using the manipulated variable changes $\Delta u_k$.

2. The method of claim 1, wherein manipulated variable changes $\Delta u_k$ for the instantaneous regulating cycle k are determined on the basis of a first input matrix $B_1$ of predefined matrix elements and a second input matrix $B_2$ of predefined matrix elements, using both terms $-B_1^{-1} \cdot \Delta x_{k-1}$ and $-B_1^{-1} \cdot B_2 \cdot \Delta u_{k-1}$.

3. The method of claim 1, wherein manipulated variable change $\Delta u$ of at least one of an exhaust gas recirculation rate EGR in the intake manifold and an injection angle SOI is output.

4. The method of claim 2, wherein the first input matrix $B_1$ and the second input matrix $B_2$ as matrix elements include partial derivations of controlled variables according to the manipulated variables.

5. The method of claim 4, wherein a matrix element disappears at the location where the manipulated variable has no effect on a controlled variable.

6. The method of claim 1, wherein system deviations $\Delta x$ of at least one of a mean indexed pressure IMEP, an air ratio λ and a location of the center of combustion MFB50 are detected for regulating the operating point, and system deviations $\Delta x$ of at least one of a mean indexed pressure IMEP and a location of the center of combustion MFB50 are detected for cylinder balancing.

7. The method of claim 1, wherein manipulated variable changes $\Delta u$ of at least one of an injection quantity q, of a closing angle EVC of the exhaust valve and of an exhaust gas recirculation rate EGR in the intake manifold are output for regulating the operating point, and manipulated variable changes $\Delta u$ of at least one of an injection quantity q and of an injection angle SOI are output for cylinder balancing.

8. The method of claim 1, wherein a manipulated variable dynamics is taken into account, a difference between the commanded value and the instantaneous value of a first manipulated variable being compensated by intervention into a second manipulated variable.

9. The method of claim 1, wherein an adaptation of precontrol characteristics maps is carried out, precontrol values dependent on the operating point being altered by integral components of manipulated variable changes $\Delta u$ resulting long-term at the respective operating point.

10. A control system for regulating HCCI combustion, comprising:
   a controller including a processor for regulating HCCI combustion of fuel in a reactor of an internal combustion engine, by determining, as part of a multivariable regulation, manipulated variable changes $\Delta u_k$ for controlling the instantaneous regulating cycle k based on at least system deviations $\Delta x_{k-1}$ and manipulated variable changes $\Delta u_{k-1}$ of a preceding regulating cycle k−1, wherein system deviation $\Delta x$ of at least one of a mean indexed pressure IMEP, an air ratio λ, and a maximum pressure gradient dpmax is detected, and wherein decoupling of cylinder-individual interventions for cylinder balancing from global interventions is carried out for regulating an operating point, and wherein the controller controls the HCCI combustion using the manipulated variable changes $\Delta u_k$.

11. The method of claim 1, wherein manipulated variable changes $\Delta u_k$ for the instantaneous regulating cycle k are determined on the basis of a first input matrix $B_1$ of predefined matrix elements and a second input matrix $B_2$ of predefined matrix elements, using both terms $-B_1^{-1} \cdot \Delta x_{k-1}$ and $-B_1^{-1} \cdot B_2 \cdot \Delta u_{k-1}$, according to $\Delta u_k \propto -B_1^{-1} \Delta x_{k-1} - B_1^{-1} \cdot B_2 \cdot \Delta u_{k-1}$.

12. The method of claim 1, wherein system deviations Δx of a mean indexed pressure IMEP, an air ratio λ, a location of the center of combustion MFB50 and a maximum pressure gradient dpmax are detected.

13. The method of claim 1, wherein manipulated variable changes Δu of an injection quantity q, of a closing angle EVC of the exhaust valve, an exhaust gas recirculation rate EGR in the intake manifold and of an injection angle SOI are output.

14. The method of claim 1, wherein system deviations Δx of a mean indexed pressure IMEP, an air ratio λ and a location of the center of combustion MFB50 are detected for regulating the operating point, and system deviations Δx of a mean indexed pressure IMEP and a location of the center of combustion MFB50 are detected for cylinder balancing.

15. The method of claim 1, wherein manipulated variable changes Δu of an injection quantity q, of a closing angle EVC of the exhaust valve and of an exhaust gas recirculation rate EGR in the intake manifold are output for regulating the operating point, and manipulated variable changes Δu of an injection quantity q and of an injection.

16. A method for regulating a HCCI combustion of fuel in a combustion chamber of an internal combustion engine in which a multivariable regulation is used, comprising:

determining, by a controller including a processor, for the instantaneous regulating cycle k, at least one manipulated variable change $\Delta u_k$ of at least one of an injection quantity q, a closing angle EVC of an exhaust valve, an exhaust gas recirculation rate EGR in an intake manifold, and an injection angle SOI on the basis of at least one manipulated variable change $\Delta u_{k-1}$ of a preceding regulation cycle k−1 and at least one system deviation $\Delta x_{k-1}$ of at least one of a mean indexed pressure IMEP, an air ratio λ, a location of the center of combustion MFB50 and a maximum pressure gradient $dp_{max}$ for the previous regulation cycle k−1, wherein decoupling of cylinder-individual interventions for cylinder balancing from global interventions is carried out for regulating the operating point; and controlling, by the controller, the HCCI combustion using the manipulated variable changes $\Delta u_k$.

* * * * *